(12) United States Patent
Shih et al.

(10) Patent No.: US 9,127,402 B2
(45) Date of Patent: Sep. 8, 2015

(54) METHOD FOR LIQUEFYING BIOMASS

(75) Inventors: Ruey-Fu Shih, New Taipei (TW); Hom-Ti Lee, Hsinchu (TW); Hou-Peng Wan, Taoyuan County (TW); Ying-Hsi Chang, Taoyuan County (TW); Jia-Yuan Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 756 days.

(21) Appl. No.: 13/517,643

(22) Filed: Jun. 14, 2012

(65) Prior Publication Data
US 2013/0139812 A1    Jun. 6, 2013

(30) Foreign Application Priority Data

Dec. 6, 2011 (TW) .............................. 100144780 A

(51) Int. Cl.
| | |
|---|---|
| C08B 37/00 | (2006.01) |
| D21C 1/06 | (2006.01) |
| C08B 1/00 | (2006.01) |
| C10G 1/00 | (2006.01) |
| D21C 3/02 | (2006.01) |
| D21C 3/20 | (2006.01) |
| D21C 3/22 | (2006.01) |

(52) U.S. Cl.
CPC . *D21C 1/06* (2013.01); *C08B 1/003* (2013.01); *C10G 1/00* (2013.01); *D21C 3/02* (2013.01); *D21C 3/20* (2013.01); *D21C 3/222* (2013.01)

(58) Field of Classification Search
None
See application file for complete search history.

(56) References Cited

U.S. PATENT DOCUMENTS

| | | | |
|---|---|---|---|
| 4,145,188 A | 3/1979 | Espenscheid et al. | |
| 4,266,083 A | 5/1981 | Huang | |
| 4,647,704 A | 3/1987 | Engel et al. | |
| 4,670,613 A | 6/1987 | Ruyter et al. | |
| 4,935,567 A | 6/1990 | Yokoyama et al. | |
| 5,336,819 A | 8/1994 | McAuliffe et al. | |
| 7,183,433 B2 | 2/2007 | Abbott et al. | |
| 7,959,765 B2 | 6/2011 | Argyropoulos | |
| 2007/0215300 A1 | 9/2007 | Upfal et al. | |

(Continued)

FOREIGN PATENT DOCUMENTS

| | | |
|---|---|---|
| CA | 2 685 420 A1 | 9/2008 |
| CN | 101245566 A | 8/2008 |

(Continued)

OTHER PUBLICATIONS

China Office Action for Appl. No. 201110421279.7 dated Jun. 4, 2014.

(Continued)

*Primary Examiner* — Melvin C Mayes
*Assistant Examiner* — Stefanie Cohen
(74) *Attorney, Agent, or Firm* — Birch, Stewart, Kolasch & Birch, LLP

(57) ABSTRACT

The disclosure provides a method for liquefying biomass, including: (a) mixing a solid organic ammonium salt containing single nitrogen with at least one organic compound which is capable of forming a hydrogen bond with the solid organic ammonium salt to form a first mixture; (b) heating the first mixture until the first mixture becomes a solution; (c) mixing a biomass and an acid catalyst with the solution to form a second mixture; and (d) heating the second mixture to make the biomass therein convert into a liquefied product.

15 Claims, 3 Drawing Sheets

(56) References Cited

U.S. PATENT DOCUMENTS

| | | |
|---|---|---|
| 2008/0072478 A1 | 3/2008 | Cooper |
| 2008/0190013 A1 | 8/2008 | Argyropoulos |
| 2008/0227162 A1 | 9/2008 | Varanasi et al. |
| 2010/0297704 A1 | 11/2010 | Li |
| 2010/0307050 A1 | 12/2010 | Sen et al. |
| 2010/0319862 A1 | 12/2010 | Rahman |
| 2011/0065159 A1 | 3/2011 | Raines et al. |
| 2011/0065814 A1 | 3/2011 | Matson et al. |
| 2011/0094147 A1 | 4/2011 | Bartek et al. |
| 2011/0180752 A1* | 7/2011 | Zhu et al. ........... 252/182.31 |

FOREIGN PATENT DOCUMENTS

| | | |
|---|---|---|
| CN | 1836068 A | 9/2008 |
| CN | 101270296 A | 9/2008 |
| CN | 101298744 A | 11/2008 |
| CN | 201198470 Y | 2/2009 |
| CN | 101396838 A | 4/2009 |
| CN | 101407727 A | 4/2009 |
| CN | 101619227 A | 1/2010 |
| CN | 101765650 A | 6/2010 |
| CN | 101805629 A | 8/2010 |
| CN | 101856619 A | 10/2010 |
| CN | 102146017 A | 8/2011 |
| EP | 2 322 588 A1 | 5/2011 |
| JP | 60-262888 A | 12/1985 |
| JP | 61-66789 A | 4/1986 |
| JP | 61-115994 A | 6/1986 |
| JP | 61-225280 A | 10/1986 |
| JP | 2-102295 A | 4/1990 |
| KR | 10-2009-0013817 A | 2/2009 |
| TW | 201111513 A1 | 4/2011 |
| WO | WO 2008/098032 A2 | 8/2008 |
| WO | WO 2008/157164 A1 | 12/2008 |
| WO | WO 2008/157165 A1 | 12/2008 |
| WO | WO 2009/047023 A1 | 4/2009 |
| WO | WO 2010/012132 A2 | 2/2010 |
| WO | WO 2010/023136 A1 | 3/2010 |
| WO | WO 2011/009074 A2 | 1/2011 |
| WO | WO 2011/028776 A1 | 3/2011 |
| WO | WO 2011/028783 A2 | 3/2011 |
| WO | WO 2011/028788 A1 | 3/2011 |

OTHER PUBLICATIONS

Taiwanese Office Action, dated Jan. 6, 2014, for Patent Application No. 100144780.
EPO Extended Search Report for Appl. No. 12177747 dated Apr. 16, 2013.
Jin, Y. et al, "Liquefaction of lignin by polyethyleneglycol and glycerol," Bioresource Technology, 2011, vol. 102, pp. 3581-3583.
Spronsen, J.V. et al, "Separation and recovery of the constituents from lignocellulosic biomass by using ionic liquids and acetic acid as co-solvents for mild hydrolysis," Chemical Engineering and Processing, 2011, vol. 50, pp. 196-199.
Arvela et al., "Dissolution of lignocellulosic materials and its constituents using ionic liquids-A review", Industrial Crops and Products, vol. 32, 2010, pp. 175-201.
Cheng et al., "Highly Efficient Liquefaction of Woody Biomass in Hot-Compressed Alcohol-Water Co-solvents", Energy Fuels, vol. 24, 2010, pp. 4659-4667.
Hammerschmidt et al., "Catalytic conversion of waste biomass by hydrothermal treatment", Fuel, 2010, pp. 1-8.
Nakamura et al., "Liquefaction behavior of Western red cedar and Japanese beech in the ionic liquid 1-ethyl-3-methylimidazolium chloride", Holzforschung, vol. 64, 2010, pp. 289-294.
Tymchyshyn et al., "Liquefaction of bio-mass in hot-compressed water for the production of phenolic compounds", Bioresource Technology, vol. 101, 2010, pp. 2483-2490.
Wasserscheid et al., "Ionic Liquids in Synthesis", WILEY-VCH, 3 pages, 2003.
Yamada et al., "Condensation Reaction of Degraded Lignocellulose during Wood Liquefaction in the Presence of Polyhydric Alcohols", Journal of the Adhesion Society of Japan, vol. 37, No. 12, 2001, pp. 471-478.

\* cited by examiner

METHOD FOR LIQUEFYING BIOMASS

CROSS REFERENCE TO RELATED APPLICATIONS

This Application claims priority of Taiwan Patent Application No. 100144780, filed on Dec. 6, 2011, the entirety of which is incorporated by reference herein.

TECHNICAL FIELD

The present disclosure relates to a method for liquefying biomass, and in particular relates to a method for liquefying biomass by using an organic ammonium salt solution.

BACKGROUND

Techniques for liquefying biomass at a normal pressure has advantages of mild reacting condition requirements, simple equipment requirements, and is capable of replacing petrochemical compounds and fuel oils when made into appropriate products, etc. Thus, currently there is much research on developing techniques for liquefying biomass at a normal pressure. The most typical technique for liquefying biomass at a normal pressure, adopts wood powder and phenol as a liquefying solvent for a process, at a ratio of 1:8, and 3% of $H_2SO_4$ as a catalyst. The reacting temperature and time used is 180° C. and 2 hours, respectively. The residue rate of the liquefied product obtained from the process is 30% (Journal of Beijing Forestry University, Vol. 26, issue 5, 2004, p. 67). In another example, a process adopts wood powder and a polyhydric alcohol (polyol) as a liquefying solvent, such as ethylene glycol for a process, at a ratio of 1:4, and 0.25% of $H_2SO_4$ as a catalyst. The reacting temperature and time used is 250° C. and 1 hour, respectively. The residue rate of the liquefied product obtained from the process is 5% (Rezzoug et al., 2002). However, because the processes use a corrodent catalyst and the reacted phenol or ethylene glycol is hard to be recycled, the process has not been widely commercially applied.

In 2002, it was disclosed that an alkyllimidazolium chloride ionic liquid is capable of dissolving cellulose at a low temperature (Swatloski et al., 2002). Furthermore, Zhang (Zhang et al., 2010) discovered that the water in an ionic liquid at mild conditions had a high Kw value (which was higher than pure water at room temperature conditions for 3 orders of a magnitude). The disclosure was very important for biomass hydrolysis and liquefaction since such a high Kw value typically is only able to be reached at an extremely high temperature or sub-critical conditions.

U.S. Pat. No. 7,959,765 B2 discloses using an alkyllimidazolium chloride ionic liquid to partially dissolve wood powder to promote reactions for liquefaction and depolymerization. The method comprises mixing pine wood powder with [AMIM]Cl ionic liquid to form a mixture with a concentration of 10 wt %, placing the mixture into a flask with an opening connected to a vacuum distillation apparatus and slowly raising a temperature of the mixture to 200° C., and reacting the mixture for 20 minutes. The liquid-oil product obtained from 20 minutes of vacuum distillation had a 15% residue rate. WO2011028776 discloses a mixture of hydrates of $ZnCl_2$, $CaCl_2$, etc. which forms an ionic liquid at a temperature of 200-600° C., which partially dissolves wood powder to promote a reaction for liquefaction and depolymerization. In the process, a catalyst may be used to perform reactions such as hydrogenation, hydrogenolytic cleavage, catalytic cracking and thermal cleavage to raise the quality level of pyrolysis oils.

Accordingly, it is known that for liquefying and depolymerizing biomass, effectively, using ionic liquid as a solvent is an important technique. Based on the articles "Electrochemical aspects of Ionic liquids" written by Hiroyuki Ohno, and "Ionic liquids in synthesis" written by Peter Wasserscheid and Tom Welton, or "AIChE Journal, Vol. 47, 2001, p. 2384-2389" issued by Joan F. Brennecke and Edward J. Maginn, it is known that an ionic liquid is defined as "a liquid that consists entirely of ions with a melting point of less than 100° C.". A cation structure of a common ionic liquid mainly is pyridinium, imidazolium or pyrrolidinium. However, ionic liquid is expensive and thus, is not mass produced. Accordingly, it is not convenient to purchase ionic liquid commercially.

Therefore, a new method for liquefying biomass, which has the advantages of having excellent liquefying effects with low costs is needed.

BRIEF SUMMARY

The disclosure provides a method for liquefying biomass, comprising: (a) mixing a solid organic ammonium salt containing single nitrogen with at least one organic compound which is capable of forming a hydrogen bond with the solid organic ammonium salt to form a first mixture; (b) heating the first mixture until the first mixture becomes a solution; (c) mixing a biomass and an acid catalyst with the solution to form a second mixture; and (d) heating the second mixture to make the biomass therein convert into a liquefied product.

The present disclosure also provides a method for using an organic ammonium salt solution for liquefying biomass, wherein the organic ammonium salt solution is formed by mixing a solid organic ammonium salt containing single nitrogen with at least one organic compound which is capable of forming a hydrogen bond with the solid organic ammonium salt and heating the mixture.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In one aspect, the present disclosure provides a new method for liquefying biomass. As compared to the conventional method for liquefying biomass by using an ionic liquid, the method of the present disclosure uses an organic ammonium salt solution to liquefy biomass, wherein the biomass has an excellent liquid conversion rate and the manufacturing cost thereof is reduced.

Figure 1:
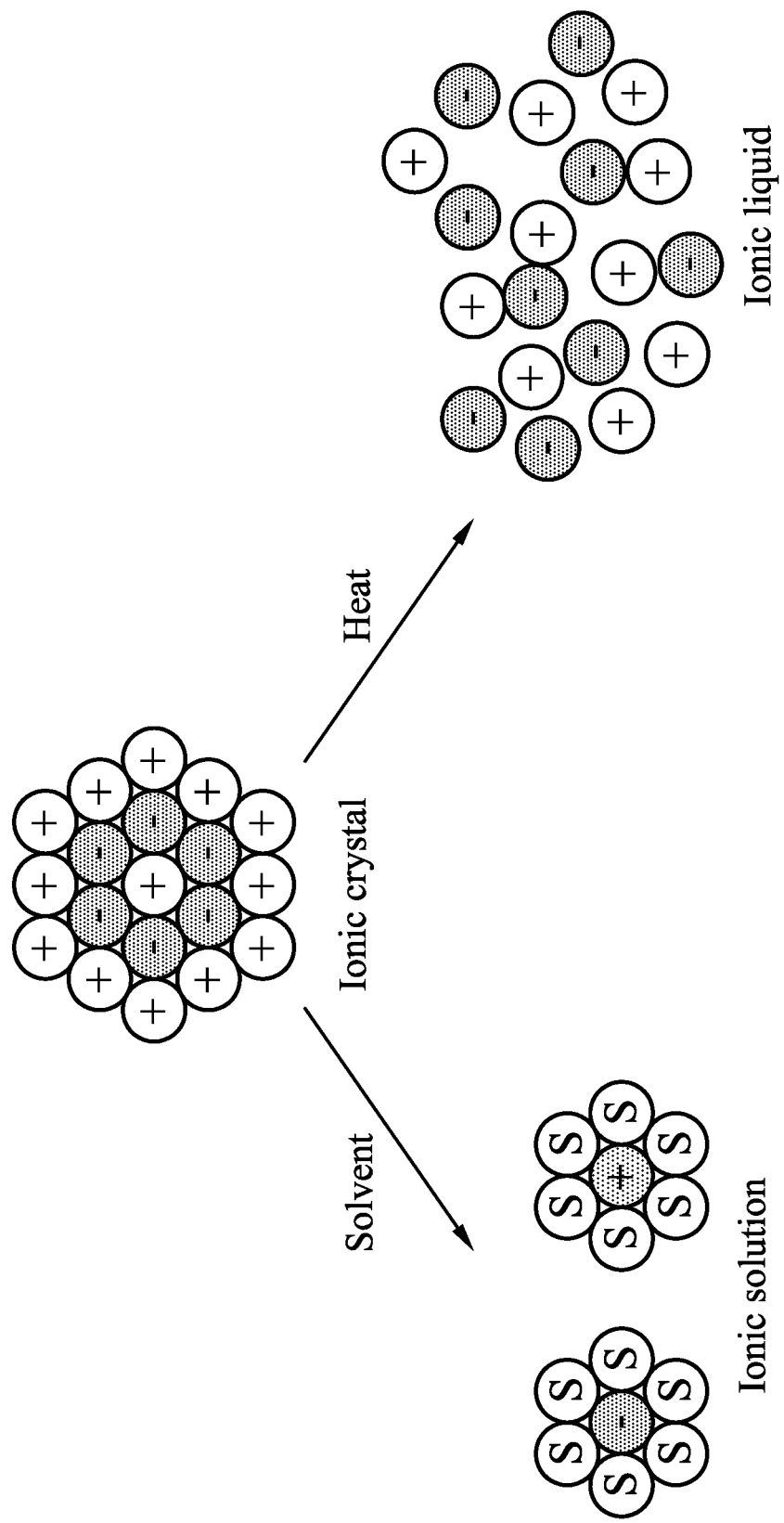
FIG. 1 illustrates the difference between an ionic liquid and an ionic solution.

The definition of an ionic liquid is "a liquid that consists entirely of ions" and in contrast, the definition of an ionic solution is "a solution of a salt in a molecular solvent" (Stark, A.; Seddon, K. Ionic Liquids. In Kirk-Othmer Encyclopedia of Chemical Technology; JohnWiley and Sons: New York, 2007; Vol 26; pp 836-920). FIG. 1 illustrates the difference between an ionic liquid and an ionic solution. According to FIG. 1, it is known that an ionic crystal, after being heated to the melting point thereof, will become an ionic liquid. Whereas, an ionic solution is formed after an ionic crystal is mixed with a solvent.

The method of the present disclosure is detailed in the following:

First, a solid organic ammonium salt containing single nitrogen is mixed with at least one organic compound which is capable of forming a hydrogen bond with the solid organic ammonium salt to form a first mixture.

In one embodiment, in the first mixture, the amount of the solid organic ammonium salt containing single nitrogen is about 60-95 parts by weight, preferably is about 89-90 parts by weight, and the amount of the at least one organic compound which is capable of forming a hydrogen bond with the solid organic ammonium salt is about 5-40 parts by weight, preferably is about 10-20 parts by weight.

The solid organic ammonium salt containing single nitrogen have a formula as shown as Formula (I):

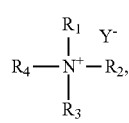

Formula (I)

wherein $R_1$, $R_2$, $R_3$ and $R_4$ may independently be H, alkyl with or without substituent, alkenyl with or without substituent, cycloalkyl with or without substituent, aryl with or without substituent, or alkaryl with or without substituent, and the substituent may be —OH, —Cl, —Br, —I or —CN, and $Y^-$ is F—, Cl—, Br—, I—, $NO_3^-$, $HSO_4^-$, $BF_4^-$, $CN^-$, $SO_3CF_3^-$ or $COOCF_3$.

In one embodiment, the solid organic ammonium salt containing single nitrogen comprises cycloalkyltrialkylammonium, aryltrialkylammonium, alkaryltrialkylammonium, alkenyltrialkylammonium or tetraalkylammonium.

The reason for using the solid organic ammonium salt containing single nitrogen in the method of the present disclosure is summarized in the following:

According to the article, P. Wasserscheid, W. Keim, Angewandte Chemie, International Edition, Vol. 39, 2000, p. 3772-3789, it is known that a molecular design of functional groups around nitrogen on an alkyllimidazolium chloride for an ionic liquid is limited by having a melting point which is lower than 100° C. for the alkyllimidazolium chloride. Thus, a carbon number of the alkyl around the nitrogen on the alkyllimidazolium chloride is most probably greater than 2 so that the melting point for the alkyllimidazolium chloride less than 100° C. According to Maki-Arvela et al. (Industrial Crops and Products, p. 175-201, 2010), it was concluded that a chemical structure of an alkyllimidazolium chloride for ionic liquid having the strongest ability for dissolving cellulose comprised, in addition the anion thereof being a strong receptor of a hydrogen bond, the characteristic wherein the lesser the volume of the cation [R-MIM$^+$], the greater the dissolving ability of the alkyllimidazolium chloride for ionic liquid to the cellulose, and the greater the polarity of the alkyllimidazolium cation [R-MIM$^+$], the greater the dissolving ability of the alkyllimidazolium chloride for ionic liquid to the cellulose. In the present day, it was discovered that ionic liquids, [EMIM]Cl (1-Ethyl-3-methyl-imidazolium chloride), [AMIM]Cl (1-Allyl-3-methyl-imidazolium chloride) and [BMIM]Cl (1-Butyl-3-methyl-imidazolium chloride), etc., are capable of partially dissolving or swelling biomass (for example, wood powder) to best promote the efficiency of the reaction for liquefaction and depolymerization (Table 1).

TABLE 1

Solubilities of cellulose and cation radiuses of ionic liquids

| Ionic liquid | Melting point (° C.) | Solubility of cellulose (wt %) | Cation | Cation radius (Å) |
|---|---|---|---|---|
| [EMIM]Cl | 87 | 15.8% (80° C.) | [EMIM$^+$] | 3.75 |
| [AMIM]Cl |  | 14.5% (80° C.) | [AMIM$^+$] | Between 3.75 and 4.03 |
| [BMIM]Cl | 65 | 10% (100° C.) 3% (70° C.) | [BMIM$^+$] | 4.03 |

However, for a conventional organic ammonium salt, if the cation radius thereof is less than 4.03 Å of that of [BMIM$^+$] (the cation of 1-butyl-3-methyl-imidazolium), the volume of the alkyl around the nitrogen of the cation thereof will become smaller but the organic ammonium salt is in a solid form (the melting point thereof is greater than 100° C.). Therefore, the method of the present disclosure uses organic ammonium salts and organic solvents to prepare organic ammonium salt solutions to make the organic ammonium salt solutions have physical properties similar to those of ionic liquids such as [EMIM]Cl•[AMIM]Cl and [BMIM]Cl, etc. and have the ability for partially dissolving or swelling biomass so that a catalyst may enter into an inner layer of a micro crystallized cellulose and develop a catalytic ability thereof, and make the biomass be liquefied and depolymerized into small molecular products.

Therefore, according to the foregoing, in one embodiment, a solid organic ammonium salt containing single nitrogen suitable for the method of the present disclosure may be selected according to the following conditions: (i) the cation radius of the organic ammonium salt is less than that of [BMIM$^+$] (4.03 Å); and/or (ii) the cation of the organic ammonium salt has a high polarity.

Examples of the organic ammonium salt containing single nitrogen selected by the conditions may comprise, but are not limited to, tetramethylammonium chloride, allyltrimethylammonium chloride, methyltriethylammonium chloride, benzyltriethylammonium chloride or choline chloride. Table 2 in the following shows the melt points, cation structures and cation radiuses of the organic ammonium salts recited above.

TABLE 2

Melt points, cation structures and cation radiuses of the organic ammonium salts

| Organic ammonium salt | Melting point (° C.) | Cation structure | Cation radius (Å) |
|---|---|---|---|
| Tetramethylammonium chloride | 420 | $(CH_3)_4N^+$ | 2.85 |
| Allyltrimethylammonium chloride | — | $CH_2=C_2H_4(CH_3)_3N^+$ | <3.36 |

TABLE 2-continued

Melt points, cation structures and cation radiuses of the organic ammonium salts

| Organic ammonium salt | Melting point (° C.) | Cation structure | Cation radius (Å) |
|---|---|---|---|
| Methyltriethylammonium chloride | 282 | $CH_3(C_2H_5)_3N^+$ | 3.48 |
| Bbenzyltriethylammonium chloride | 239 | $C_6H_5CH_2(C_2H_5)_3N^+$ | 3.48 |
| Choline chloride | 302 | $HOC_2H_4(CH_3)_3N^+$ | 3.26 |

Moreover, in one embodiment, the solid organic ammonium salt containing single nitrogen is allyltrimethylammonium chloride.

In addition, the at least one organic compound which is capable of forming a hydrogen bond with the solid organic ammonium salts may comprise a hydroxyl-containing compound.

The above-mentioned hydroxyl-containing compound may comprise three kinds of compounds as shown in the following (i)-(iii), but are not limited thereto:

(i) An alcoholic compound having the formula as shown as Formula (II):

$$R_5CHOH[(CH_2)_nCHOH]_mR_6 \quad \text{Formula (II)}$$

wherein R5 and R6 independently are H, alkyl, alkenyl, cycloalkyl, aryl, or alkaryl, and n is an integer of 0-2, and m is an integer of 0-3. Furthermore, examples of the alcoholic compound having the formula shown as Formula (II) may comprise, but are not limited to, butanol, ethylene glycol, 1,3 propylene glycol, allyl alcohol, cyclohexanol and phenylmethanol.

(ii) A compound having the formula as shown as Formula (III):

$$HO(CH_2CH_2O)_pH \quad \text{Formula (III),}$$

wherein p is an integer of 2-10. Moreover, example of the compound having the formula as shown as Formula (III) may comprise, but are not limited to, diglycol.

(iii) A phenolic compound selected from a group consisting of phenol, cresol, p-hydroxybenzoic acid and dihydroxybenzene.

In addition, in one embodiment, the at least one organic compound which is capable of forming a hydrogen bond with the solid organic ammonium salt used in the method of the present disclosure may be a combination of the alcoholic compound having the formula as shown as Formula (II) and the phenolic compound. In this embodiment, the weight ratio of the alcoholic compound having the formula as shown as Formula (II) to the phenolic compound may be about 1:1-1:9, but is not limited thereto.

In one embodiment, the at least one organic compound capable of providing the hydrogen bond be a combination of glycerol and the phenol. In this embodiment, the weight ratio of glycerol to the phenol may be about to 2:1, but is not limited thereto.

Next, after forming the first mixture, the first mixture is heated until the first mixture becomes a solution. In one embodiment, a temperature for heating the first mixture may be about 60-150° C., and time for heating the first mixture may be about 5-120 minutes.

After that, after the first mixture becomes a solution, a biomass and an acid catalyst are mixed with the solution to form a second mixture.

In one embodiment, in the second mixture, the amount of the solution is about 45-100 parts by weight, preferably is 75-87 parts by weight, the amount of the biomass is about 3-40 parts by weight preferably is 10-15 parts by weight, and the amount of the acid catalyst is about 1-15 parts by weight, preferably is 3-10 parts by weight.

The biomass used in the method of the present disclosure is plant biomass. In one embodiment, the source of the biomass may comprise, but are not limited to, algae, wood, grass, leaves, corn stalks, corn cobs, rice stalks, paddy, wheat stalks, sugarcane bagasse, bamboo, platycodon root or waste paper, etc.

In one embodiment, the constituents of the biomass may comprise, but are not limited to, cellulose, hemi-cellulose and/or lignin.

In addition, the acid catalyst comprise a Bronsted acid or an organic acid. Examples of the Bronsted acid may comprise, but are not limited to, sulfuric acid, hydrochloric acid, nitric acid, phosphoric acid and organic sulfonic acid. Moreover, the organic acid may comprise an organic acid containing a carboxyl group.

Finally, after forming the second mixture, the second mixture is heated to make the biomass therein convert into a liquefied product. In one embodiment, a temperature for heating the second mixture to make the biomass convert into the liquefied product is about 130-190° C., preferably is 150-180° C. In another embodiment, the time for heating the second mixture to make the biomass convert into the liquefied product is about 30-120 minutes, preferably is 45-100 minutes.

In addition, in another embodiment, the method of the present disclosure may further comprise a step of, after forming the liquefied product, removing residues in the liquefied product.

Furthermore, in another aspect of the present disclosure, the present disclosure provides a method for using an organic ammonium salt solution for liquefying biomass. The organic ammonium salt solution is formed by mixing a solid organic ammonium salt containing single nitrogen with at least one organic compound which is capable of forming a hydrogen bond with the solid organic ammonium salt and heating the mixture. The descriptions regarding the solid organic ammonium salt containing single nitrogen and the organic compound which is capable of forming a hydrogen bond with the solid organic ammonium salts used in the present disclosure are the same as the foregoing paragraphs.

Moreover, in the method of the present disclosure, by mixing a biomass and an acid catalyst with the organic ammonium salt solution, the propose for converting the biomass into a liquefied product is reached. A heating temperature for converting the biomass into the liquefied product is about 130-190° C., preferably is 150-180° C., and heating time for converting the biomass into the liquefied product is about 30-120 minutes, preferably is 45-100 minutes.

The biomass used in the present disclosure is plant biomass. In one embodiment, a source of the biomass may comprise, but are not limited to, algae, wood, grass, leaves, corn stalks, corn cobs, rice stalks, paddy, wheat stalks, sugarcane bagasse, bamboo, platycodon root or waste paper, etc.

In one embodiment, the constituents of the biomass comprise, but are not limited to, cellulose, hemi-cellulose and/or lignin.

The acid catalyst may comprise a Bronsted acid or an organic acid. Examples of the Bronsted acid may comprise, but are not limited to, sulfuric acid, hydrochloric acid, nitric acid, phosphoric acid and organic sulfonic acid. Moreover, the organic acid may comprise an organic acid containing a carboxyl group.

EXAMPLES

Example 1

A. Preparation for Examples 1-1 to 1-3

82 wt % of allyltrimethylammonium chloride was mixed with 18 wt % of a hydroxyl-containing compound to form a mixture, wherein the hydroxyl-containing compound consisted of glycerol and the phenol in the weight ration of 2:1. Under 1 atmospheric pressureospheric pressure, the mixture was stirred and heated to 100° C. to melt to an organic ammonium salt solution. After wood powder (the ratio of the wood powder to the mixture was 10:90) and an acid catalyst were added in to the organic ammonium salt solution a reactive mixture was formed. The reactive mixture was stirred and heated to 150° C. and reacted under 1 atmospheric pressure to make the wood therein liquefied and depolymerized.

B. Liquefied Level Analysis (Residue Rate Analysis)

After the reaction of liquefiction and depolymerization, the reactive mixture was cooled down. After cooling down, the reactive mixture solidified partially. The liquefiction and depolymerization product of the wood powder in the reactive mixture was dissolved by N,N-dimethylacetamide (allyltrimethylammonium chloride was partially dissolved), and then was filtered. Next, the filtration residue obtained from the filtration and soluble substances therein were washed with N,N-dimethylacetamide, wherein the insoluble substances were allyltrimethylammonium chloride and wood powder residue. After that, the organic ammonium salt in the insoluble substances was dissolved with 0.1N NaOH and then the filtration residue was washed by distilled water. The resulting filtration residue was dried in a 105° C. oven for 7 hours and then weighted. The wood powder in the examples was dried in a 105° C. oven for 7 hours first and then used in the experiments. Powder fineness for the pine wood powder was less than 45 mesh, and 38% of the cedar powder had powder fineness of less than 30 mesh, and 5% of the cedar powder had powder fineness greater than 30 mesh. The residue rates of the liquefied wood powder of the Examples are shown as Table 3.

TABLE 3

Residue rates of the liquefied wood powder of the Example 1

| Example | Concentration of the wood powder (wt %) | Concentration of acid catalyst' in proportion to total amount of the mixture (wt %) | Reacting time (minutes) | Residue rate (wt %) |
|---|---|---|---|---|
| 1-1 | Cedar, 10% | 3% $H_2SO_4$ | 120 | 19 |
| 1-2 | Pine wood, 10% | 6% $H_2SO_4$ | 30 | 13 |
|  |  |  | 60 | 8 |
|  |  |  | 90 | 5 |
| 1-3 | Pine wood, 10% | 10% p-toluenesulfonic acid | 30 | 12 |
|  |  |  | 60 | 8 |
|  |  |  | 90 | 5 |

C. HPLC Analysis for Liquefied Products

Figure 2:
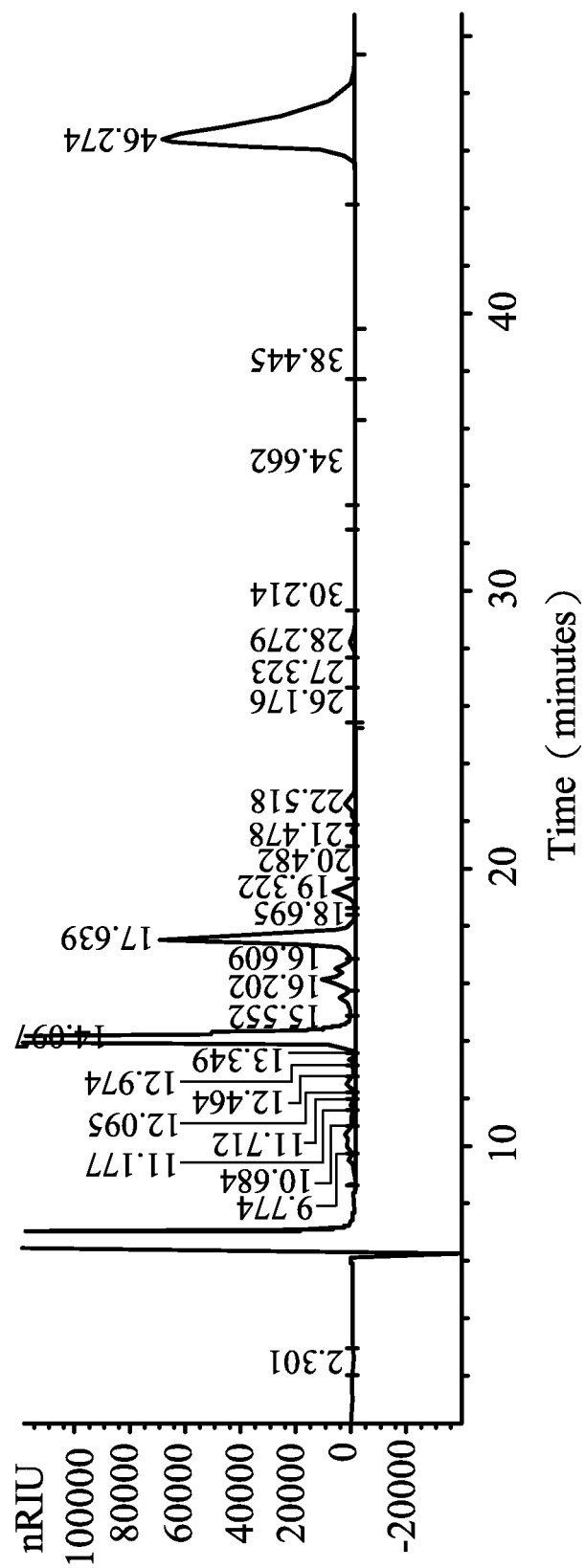
FIG. 2 shows an HPLC analysis spectrum for the liquid sample of Example 1-3.

The liquefied sample of Example 1-3 was diluted 3 fold with water and then analyzed by Agilent 1200 HPLC. The conditions for analysis were as shown in the following: the separation column: Aminex HPX-87H; the detector: Refractive index detector: the mobile phase: 0.018M $H_2SO_4$; flow rate for the mobile phase: 0.6 μm/minute; and the injection amount for the sample: 20 μl. The products which were detectable are shown in FIG. 2. FIG. 2 shows various products, and the one at the retention time of about 7 minutes is allyltrimethylammonium chloride and the other products having known retention times are listed in Table 4. Moreover, the glycerol and the phenol in the products shown in FIG. 2 may be from the original hydroxyl-containing compound.

TABLE 4

Retention time for main products obtained from HPLC analysis and the compound name thereof

| No. | Retention time (minutes) | Compound |
|---|---|---|
| 1 | 9.525 | glucose |
| 2 | 14.089 | glycerol |
| 3 | 14.413 | formic acid |
| 4 | 15.597 | acetic acid |
| 5 | 16.247 | levaliaic acid |
| 6 | 48.191 | phenol |

Example 2

A. A. Preparation for Examples 2-1 and 2-2

82 wt % of allyltrimethylammonium chloride was mixed with 18 wt % of a hydroxyl-containing compound to form a mixture, wherein the hydroxyl-containing compound consisted of glycerol and the phenol in the weight ration of 2:1. Under 1 atmospheric pressure, the mixture was stirred and heated to 100° C. to melt to an organic ammonium salt solution. The subsequent steps were the same as those described in Example 1.

B. Liquefied Level Analysis (Residue Rate Analysis)

The operation steps were the same as those described in Example 1. The residue rates of the liquefied wood powder of the Examples are shown as Table 5.

TABLE 5

Residue rates of the liquefied wood powder of the Example 2

| Example | Concentration of the wood powder (wt %) | Concentration of acid catalyst' in proportion to total amount of the mixture (wt %) | Reacting time (minutes) | Residue rate (wt %) |
|---|---|---|---|---|
| 2-1 | Cedar, 10% | 6% $H_2SO_4$ | 60 | 14 |
|  |  |  | 120 | 8 |
| 2-2 | Pine wood, 10% | 3% $H_2SO_4$ | 60 | 19 |
|  |  |  | 120 | 16 |

C. GC Analysis for Liquefied Products

Figure 3:
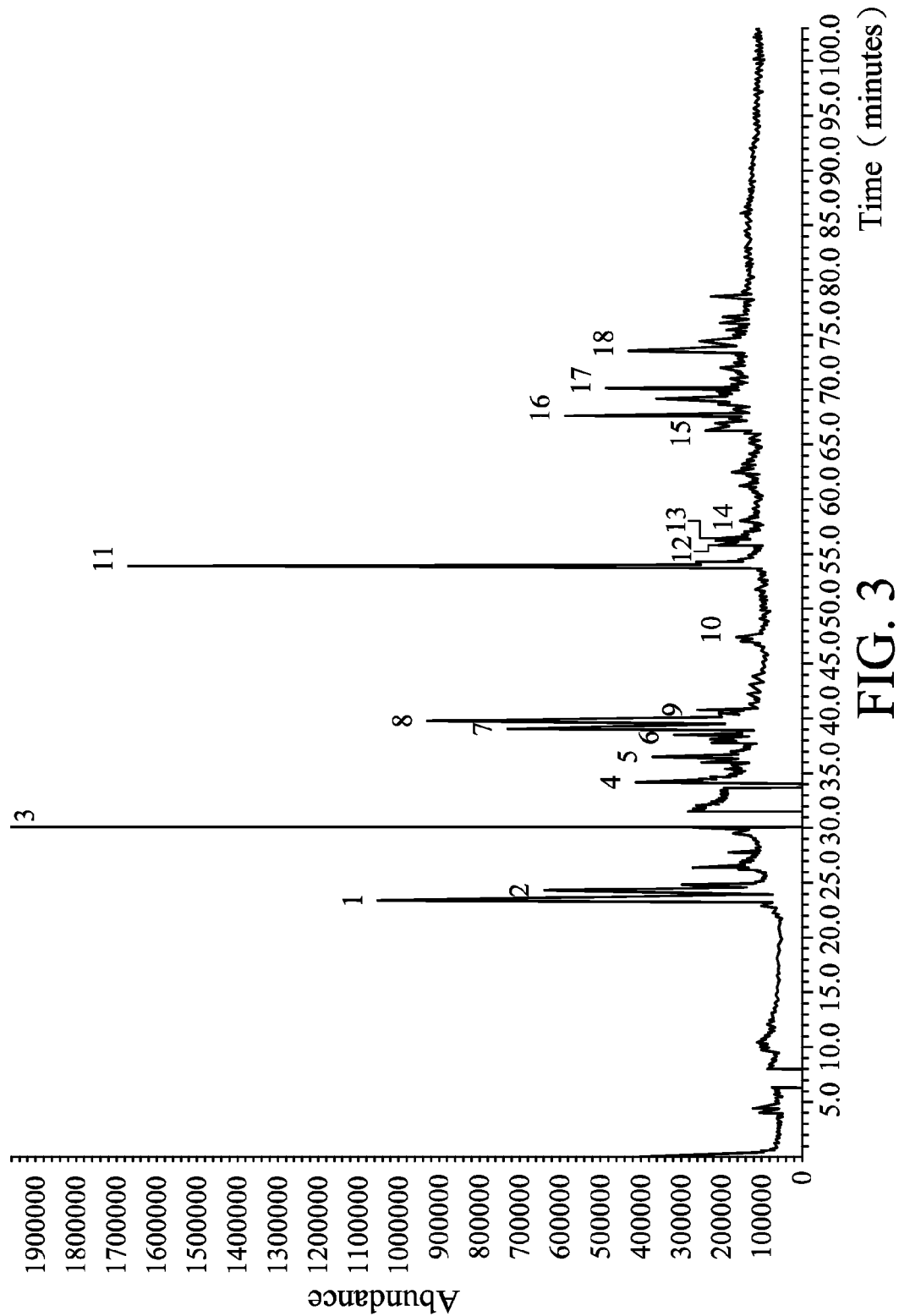
FIG. 3 shows a GC analysis spectrum for the liquid sample of Example 2-2.

Soluble substances were extracted from the liquefied product of Example 2-2 with ethyl acetate. After that, the extract was evaporated in vacuum to remove ethyl acetate and leave a black-brown liquid. The black-brown liquid was analyzed by HP 5973 GC-mass. The conditions for analysis were as shown in the following: the separation column: DB-1701, 60 m×0.25 mm×0.25 μm; temperature setting: maintained at 40° C. for 10 minutes, then raised to 300° C. by a rate of 5° C./minute and kept at 300° C. for 10 minutes; carrier gas: He; and flow rate: 34 ml/minute. The products which were detectable are shown in FIG. 3. FIG. 3 shows various products, and partial products having known retention times as listed in Table 6.

TABLE 6

Retention time for main products obtained from GC analysis and the compound name thereof

| No. | R.T. (min) | Compound |
| --- | --- | --- |
| 1 | 23.31 | 5-Methyl-3,6,8-trioxabicyclo [3.2.1]octane |
| 2 | 24.25 | 2-Hexanone |
| 3 | 30.07 | 3-Methoxy-1,2-propanediol |

TABLE 6-continued

Retention time for main products obtained from GC analysis and the compound name thereof

| No. | R.T. (min) | Compound |
| --- | --- | --- |
| 4 | 34.03 | 1,2,3-Propanetriol monoacetate |
| 5 | 36.38 | Levulinic acid |
| 6 | 38.49 | 1,3-Diacetoxypropane |
| 7 | 39.15 | 1,2-Ethanedicarboxylic acid |
| 8 | 39.71 | (2S,3R)-2-Hydroxy-3-methylsuccinic acid dimethyl ester |
| 9 | 40.67 | 1-Propen-2-ol, formate |
| 10 | 46.63 | Naphthalene, 1,2,3,4-tetrahydro-1,6-dimethyl-4-(1-methylethyl)-1,6-dimethylnaphthalene |
| 11 | 53.7 | 2-Methoxy-4-propyl-Phenol |
| 12 | 55.94 | 4-hydroxy-3-methoxy-benzeneethanol |
| 13 | 56.25 | Carbamic acid, [(1S)-2-oxo-1-(phenylmethyl)-2-(4-pyridinylamino)ethyl]-, 1,1-dimethylethyl ester |
| 14 | 57.85 | 1-methoxy-4-phenoxy-benzene |
| 15 | 66.25 | Ethanone, 1-[(1,4,4a,5,8,8a-hexahydro-3-phenyl-1,4:5,8-diepoxy naphthalene)-2-yl] ethanone |
| 16 | 67.45 | Vanillin |
| 17 | 69.95 | 3-Methyl-4-nitrosophenol |
| 18 | 73.26 | 2,2'-methylenebis-Phenol |

Example 3

A. Preparation for Examples 3-1 to 3-3

Choline chloride was mixed with different hydroxyl-containing compounds to form a mixture, respectively (compositions are shown in Table 7). Under 1 atmospheric pressure, the mixture was stirred and heated to 100° C. to melt to an organic ammonium salt solution. After wood powder and an acid catalyst were added in to the organic ammonium salt solution a reactive mixture was formed. The reactive mixture was stirred and heated to 150° C. and reacted under 1 atmospheric pressureospheric pressure to make the wood therein liquefied and depolymerized. 58% of the wood powder in the Example had powder fineness of less than 30 mesh, and 5% of the wood powder in the Example had powder fineness greater than 30 mesh.

B. Liquefied Level Analysis (Residue Rate Analysis)

The operation steps were the same as those described in Example 1. The residue rates of the liquefied wood powder of the Example are shown as Table 7.

TABLE 7

Residue rates of the liquefied wood powder of the Example 3

| Example | Organic ammonium salt (A) | Hydroxyl-containing compound (B) | A/(A + B) (mole %) | Concentration of acid catalyst, in proportion to total amount of the mixture (wt %) | Concentration of the wood powder (wt %) | Reacting temperature (° C.) | Reacting time (minutes) | Residue rate (wt %) |
| --- | --- | --- | --- | --- | --- | --- | --- | --- |
| 3-1 | Choline chloride | Glycerol | 75 | 3% $H_2SO_4$ | Pine wood, 10% | 150 | 120 | 20 |
| 3-2 | Choline chloride | Glycerol | 75 | 3% $H_2SO_4$ | Cedar, 10% | 150 | 120 | 21 |
| 3-3 | Choline chloride | ethylene glycol | 67 | 6% $H_2SO_4$ | Cedar, 10% | 165 | 120 | 24 |

Example 4

A. Preparation for Examples 4-1 to 4-2

Different solid organic ammonium salts were mixed with different hydroxyl-containing compounds to form different mixtures, respectively (compositions and content ratio are shown in Table 8). Under 1 atmospheric pressure, the mixture was stirred and heated to 100° C. to melt to an organic ammonium salt solution. After wood powder and an acid catalyst were added in to the organic ammonium salt solution a reactive mixture was formed. The reactive mixture was stirred and heated to 150° C. and reacted under 1 atmospheric pressure to make the wood therein liquefied and depolymerized. 58% of the wood powder in the Example had powder fineness of less than 30 mesh, and 5% of the wood powder in the Example had powder fineness greater than 30 mesh.

B. Liquefied Level Analysis (Residue Rate Analysis)

The operation steps were the same as those described in Example 1. The residue rates of the liquefied wood powder of the Example are shown in Table 8.

TABLE 7

Residue rates of the liquefied wood powder of the Example 4

| Example | Organic ammonium salt (A) | Hydroxyl-containing compound (B) | A/(A + B) (mole %) | Concentration of acid catalyst, in proportion to total amount of the mixture (wt %) | Concentration of the wood powder (wt %) | Reacting temperature (° C.) | Reacting time (minutes) | Residue rate (wt %) |
|---|---|---|---|---|---|---|---|---|
| 4-1 | Choline chloride | PEG/Glycerol = 9:1 | 70 | 3% $H_2SO_4$ | Cedar, 5% | 200 | 120 | 30 |
| 4-2 | Benzyl-triethylammonium chloride | Glycerol/Phenol = 2:1 | 75 | 6% $H_2SO_4$ | Cedar, 10% | 150 | 120 | 37 |

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for liquefying biomass, comprising:
   (a) mixing a solid organic ammonium salt containing single nitrogen with at least one organic compound which is capable of forming a hydrogen bond with the solid organic ammonium salt to form a first mixture;
   (b) heating the first mixture until the first mixture becomes a solution;
   (c) mixing a biomass and an acid catalyst with the solution to form a second mixture; and
   (d) heating the second mixture to make the biomass therein convert into a liquefied product.

2. The method for liquefying biomass as claimed in claim 1, wherein in the first mixture, the amount of the solid organic ammonium salt containing single nitrogen is about 60-95 parts by weight, and the amount of the at least one organic compound which is capable of forming a hydrogen bond with the solid organic ammonium salt is about 5-40 parts by weight.

3. The method for liquefying biomass as claimed in claim 1, wherein in the first mixture, the amount of the solid organic ammonium salt containing single nitrogen is about 80-90 parts by weight, and the amount of the at least one organic compound which is capable of forming a hydrogen bond with the solid organic ammonium salts is about 10-20 parts by weight.

4. The method for liquefying biomass as claimed in claim 1, wherein in the second mixture, the amount of the solution is about 45-100 parts by weight, the amount of the biomass is about 3-40 parts by weight, and the amount of the acid catalyst is about 1-15 parts by weight.

5. The method for liquefying biomass as claimed in claim 1, wherein the solid organic ammonium salt containing single nitrogen has the formula as shown as Formula (I):

$$R_4-\overset{R_1}{\underset{R_3}{\overset{|}{N^+}}}-R_2, \quad Y^-$$

Formula (I)

wherein $R_1$, $R_2$, $R_3$ and $R_4$ independently are H, alkyl with or without substituent, alkenyl with or without substituent, cycloalkyl with or without substituent, aryl with or without substituent, or alkaryl with or without substituent, and the substituent is —OH, —Cl, —Br, —I or —CN, and $Y^-$ is F—, Cl—, Br—, I—, $NO_3^-$, $HSO_4^-$, $BF_4^-$, $CN^-$, $SO_3CF_3^-$ or $COOCF_3$.

6. The method for liquefying biomass as claimed in claim 1, wherein the solid organic ammonium salt containing single nitrogen comprises cycloalkyltrialkylammonium, aryltrialkylammonium, alkaryltrialkylammonium, alkenyltrialkylammonium or tetraalkylammonium.

7. The method for liquefying biomass as claimed in claim 1, wherein the solid organic ammonium salt containing single nitrogen comprises tetramethylammonium chloride, allyltrimethylammonium chloride, methyltriethylammonium chloride, benzyltriethylammonium chloride or choline chloride.

8. The method for liquefying biomass as claimed in claim 1, wherein the at least one organic compound which is capable of forming a hydrogen bond with the solid organic ammonium salt comprises a hydroxyl-containing compound, and the hydroxyl-containing compound comprises:
   (i) an alcoholic compound having the formula as shown as Formula (II):

$R_5CHOH[(CH_2)_nCHOH]_mR_6$      Formula (II), wherein $R_5$ and $R_6$ independently are H, alkyl, alkenyl, cycloalkyl, aryl, or alkaryl, and n is an integer of 0-2, and m is an integer of 0-3;
   (ii) a compound having the formula as shown as Formula (III):

$HO(CH_2CH_2O)_pH$      Formula (III), wherein p is an integer of 2-10; or
   (iii) a phenolic compound selected from a group consisting of phenol, cresol, p-hydroxybenzoic acid and dihydroxybenzene.

9. The method for liquefying biomass as claimed in claim 8, wherein the alcoholic compound having the formula as shown as Formula (II) comprises butanol, ethylene glycol, 1,3 propylene glycol, allyl alcohol, cyclohexanol or phenylmethanol.

10. The method for liquefying biomass as claimed in claim 8, wherein the compound having the formula as shown as Formula (III) comprises diglycol.

11. The method for liquefying biomass as claimed in claim 8, wherein the at least one organic compound which is capable of forming a hydrogen bond with the solid organic ammonium salt is a combination of the alcoholic compound having the formula as shown as Formula (II) and the phenolic compound.

12. The method for liquefying biomass as claimed in claim 11, wherein in the combination of the alcoholic compound having the formula as shown as Formula (II) and the phenolic compound, the weight ratio of the alcoholic compound having the formula as shown as Formula (II) to the phenolic compound is about 1:1-1:9.

13. The method for liquefying biomass as claimed in claim 1, wherein the at least one organic compound which is capable of forming a hydrogen bond with the solid organic ammonium salt is a combination of glycerol and a phenolic compound.

14. The method for liquefying biomass as claimed in claim 1, wherein in the step (d), a temperature for heating the second mixture is about 130-190° C.

15. The method for liquefying biomass as claimed in claim 1, wherein in the step (d), the time for heating the second mixture is about 30-120 minutes.

* * * * *